United States Patent
Qi et al.

(10) Patent No.: US 11,206,115 B2
(45) Date of Patent: Dec. 21, 2021

(54) METHOD AND APPARATUS OF MANAGING BACKHAUL(BH) LINKS IN INTEGRATED ACCESS AND BH(IAB)

(71) Applicant: Samsung Electronics Co., Ltd., Suwon-si (KR)

(72) Inventors: Yinan Qi, Staines (GB); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/410,309

(22) Filed: May 13, 2019

(65) Prior Publication Data

US 2019/0349162 A1     Nov. 14, 2019

(30) Foreign Application Priority Data

May 11, 2018 (GB) .................................. 1807664
May 7, 2019 (GB) .................................. 1906411

(51) Int. Cl.
*H04L 5/00*     (2006.01)
*H04W 24/08*     (2009.01)

(52) U.S. Cl.
CPC .......... *H04L 5/0048* (2013.01); *H04W 24/08* (2013.01)

(58) Field of Classification Search
None
See application file for complete search history.

(56) References Cited

U.S. PATENT DOCUMENTS

| 2012/0020323 | A1* | 1/2012 | Noh | H04L 5/0048 370/330 |
| 2016/0044585 | A1* | 2/2016 | Xu | H04W 48/16 370/252 |
| 2017/0257139 | A1* | 9/2017 | Axnas | H04L 5/0012 |
| 2017/0311311 | A1 | 10/2017 | Frenne et al. | |

(Continued)

FOREIGN PATENT DOCUMENTS

| GB | 2569886 A | 7/2019 |
| WO | 2019/108022 A1 | 6/2019 |

OTHER PUBLICATIONS

Samsung, 'Necessary Enhancements for NR IAB', R1-1804406, 3GPP TSG RAN WG1 Meeting #92bis, Sanya, China, Apr. 6, 2018 See section 2; and figure 1.

(Continued)

*Primary Examiner* — James P Duffy
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method of configuring a reference signal to manage backhaul (BH) links in an integrated access and BH (IAB) is provided. The method includes providing channel measurement and reporting information, and using the channel measurement and reporting information to discover and maintain backup BH links.

7 Claims, 12 Drawing Sheets

(56) References Cited

U.S. PATENT DOCUMENTS

2017/0331670 A1     11/2017  Parkvall et al.
2018/0092139 A1*     3/2018  Novlan .............. H04W 56/001
2019/0312619 A1*    10/2019  Abedini ............. H04B 17/382

OTHER PUBLICATIONS

Qualcomm Incorporated, 'Enhancements to support NR backhaul links', R1-1804835, 3GPP TSG RAN WG1 Meeting #92bis, Sanya, China, Apr. 7, 2018 See sections 3-4.
Huawei et al., 'Consideration on IAB physical layer enhancement', R1-1720606, 3GPP TSG RAN WG1 Meeting #91, Reno, USA, Nov. 18, 2017 See sections 2.1-2.2.
International Search Report dated Aug. 28, 2019, issued in International Patent Application No. PCT/KR2019/005746.
Intellectual Property Office of the United Kingdom Examination Report dated Oct. 24, 2019, issued in UKIPO Application No. GB1906411.2.
3GPP TSG RAN WG2 Meeting #102. R2-1808009; "Inter-IAB-node discovery"; XP051464247 Source: Qualcomm Incorporated. See whole document, in particular section 3: "Inter-IAB-node discovery and measurements" Busan, South Korea. Dated May 10, 2018.
Huawei et al.; 3GPP Draft; R2-1802804; "Automatic Neighbour Relation in NR"; Apr. 2, 2018; XP051399919, Athens, Greece, Feb. 26-Mar. 2, 2018.
Search and Examination Report dated Jul. 13, 2021, issued in United Kingdom Application No. 1906411.2.

\* cited by examiner

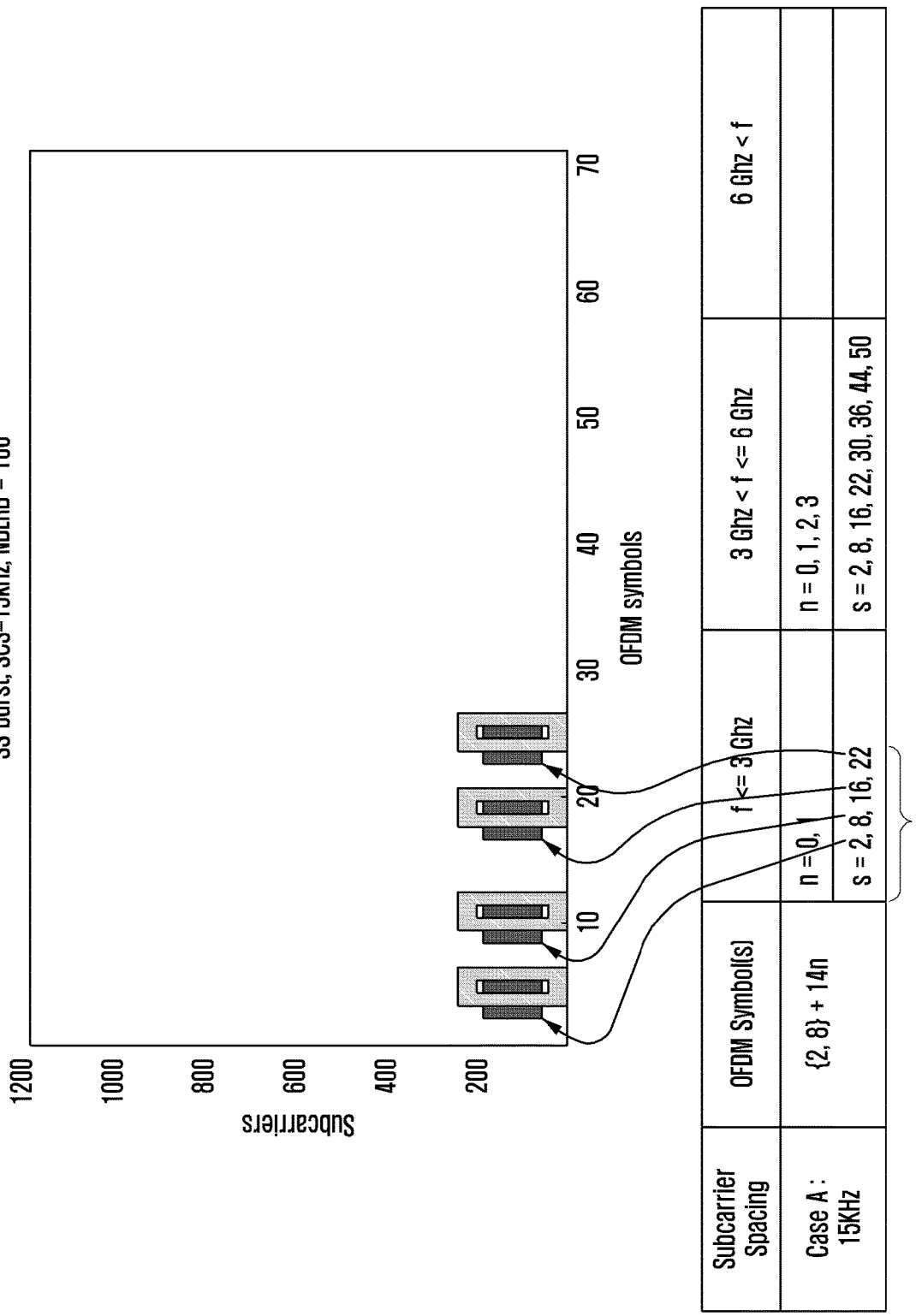

METHOD AND APPARATUS OF MANAGING BACKHAUL(BH) LINKS IN INTEGRATED ACCESS AND BH(IAB)

CROSS-REFERENCE TO RELATED APPLICATION(S)

This application is based on and under 35 U.S.C. § 119(a) of a U.K. patent application number 1807664.6, filed on May 11, 2018 in the Intellectual Property Office of the United Kingdom, and of a U.K. patent application number 1906411.2, filed on May 7, 2019 in the Intellectual Property Office of the United Kingdom, the disclosure of each of which is incorporated by reference herein in its entirety.

BACKGROUND

1. Field

The disclosure relates to wireless backhaul (BH) and relay links, assisting in the deployment of flexible and dense new radio (NR) cells without the need for increasing the density of the transport network proportionately.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

FIG. 1 shows a representation of integrated access and BH (IAB) links according to the related art.

Referring to FIG. 1, an IAB network is deployed, whereby wireless BH is utilized between the base stations of cells, A and B, and A and C, where cell A is connected by a more traditional wired connection to the network.

One of the main objectives of IAB is to provide RAN-based mechanisms to support dynamic route selection to accommodate short-term blocking and transmission of latency-sensitive traffic across BH links. This objective is also relevant to resource allocation (RA) between access and BH links under half-duplexing constraints. In the NR standard, there are three RA modes defined, namely time division multiplexing (TDM), frequency division multiplexing (FDM) and spatial division multiplexing (SDM). No matter which RA scheme is applied, there always exists a problem for inter-relay channel monitoring for topology management when blockage happens. An objective of the disclosure is to address such problems.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for configuring a reference signal to manage backhaul (BH) links in an integrated access and BH (IAB).

Additional aspects will be set forth in part in the description which follows and, in part, will be apparent from the description, or may be learned by practice of the presented embodiments.

In accordance with an aspect of the disclosure, a method of configuring a reference signal to manage BH links in an IAB is provided. The method includes providing channel measurement and reporting means, and using the channel measurement and reporting means to discover and maintain backup BH links.

In an embodiment, the reference signal is one of synchronization signal block (SSB) and channel state information-reference signals (CSI-RS). Other reference signals may also or alternatively be used.

In an embodiment, the reference signal is configured using time division multiplexing (TDM), based on a hop order.

In an embodiment, the reference signal is configured based on differing transmission periodicity.

In an embodiment, the reference signal is configured based on differing transmission beams.

In an embodiment, the differing transmission periodicity is compared to the periodicity used by access user equipment (UE)s.

In an embodiment, the reference signal is configured based on differing transmission offset in Reference Signal burst level and/or individual Reference Signal level.

In an embodiment, the reference signal configuration is carried out in a centralized manner or in a distributed manner.

In an embodiment, if the reference signal configuration is carried out in a centralized manner, it is carried out at a donor node, and if the reference signal configuration is carried out in a distributed manner, it is carried out at a relay node with which multiple further relay nodes may be associated.

In accordance with another aspect of the disclosure, an apparatus arranged to perform the method of the first aspect is provided.

In an embodiment, the apparatus is a base station.

Advantageously, various embodiments of the disclosure minimize changes to the UE synchronization procedure.

According to the disclosure, synchronization signal (SS) burst periodicities are arranged to be different for r transmission points (rTRPs)s (only a subset can be configured) at least for TDM.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure, will be more apparent from the following description taken in conjunction with the accompanying drawings in which:

FIGS. 5A and 5B show details of candidates for synchronization signal block (SSB) time location according to various embodiments of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
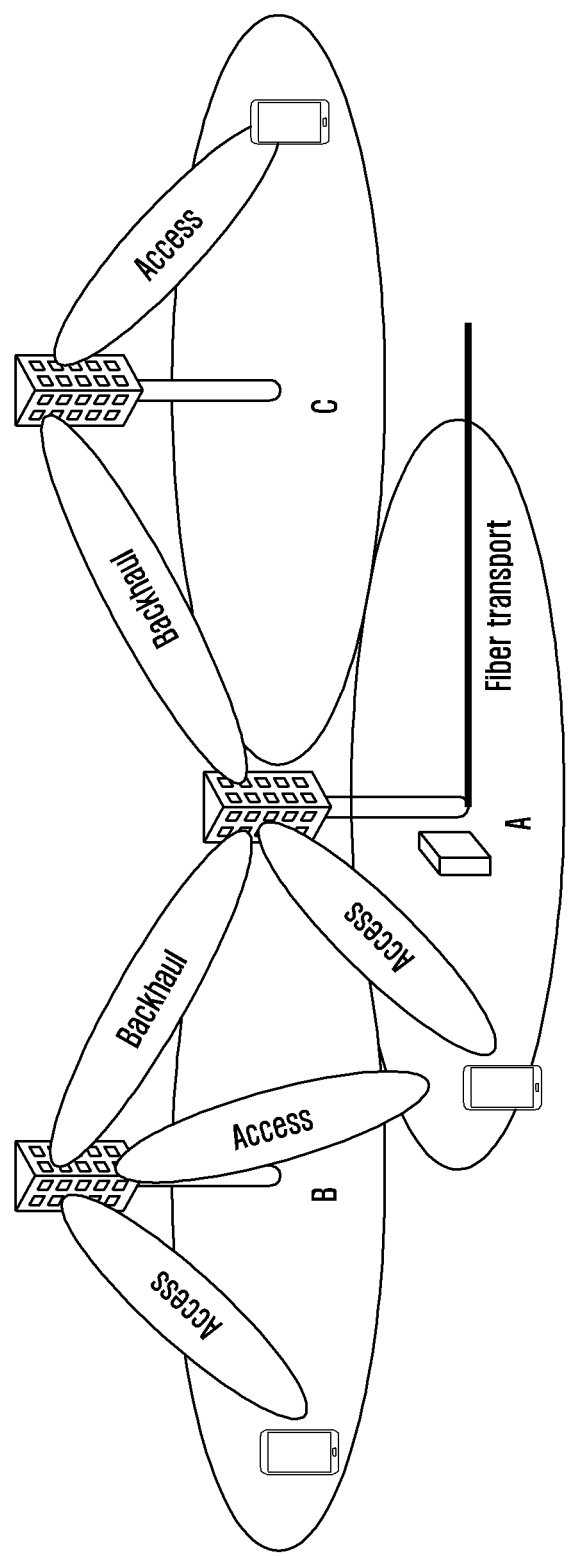
FIG. 1 shows a representation of integrated access and backhaul (BH) (IAB) links according to the related art.

FIG. 1 shows a representation of integrated access and backhaul (BH) (IAB) links according to the related art.

Figure 2:
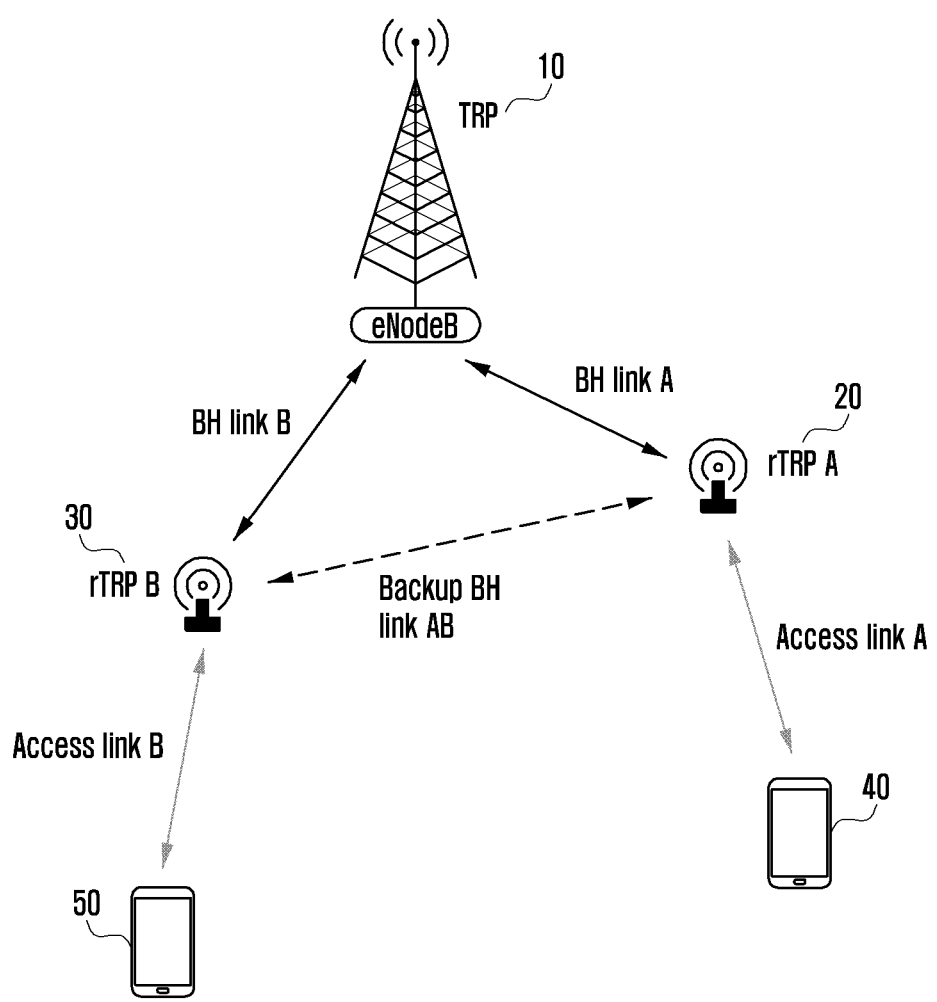
FIG. 2 shows a representation of two relay transmission points (rTRPs) A and B connected to a donor TRP according to an embodiment of the disclosure.

FIG. 2 shows a representation of two relay transmission points (rTRPs) A and B connected to a donor transmission point (TRP) according to an embodiment of the disclosure.

FIG. 2 shows a configuration where two rTRPs A 20 and B 30 are already connected to a donor TRP 10, and are synchronized with the donor TRP, wherein the synchronization can be performed with prior art techniques. Both rTRPs (rTRP A 20 and rTRP B 30) can measure the signals from donor TRP 10. FIG. 2 illustrates this scenario, and shows the various links between the different network entities involved.

However, when rTRP B 30 tries to monitor the channel from rTRP A 20 or vice versa, there is a need to have a slot where rTRP A 20 transmits and rTRP B 30 receives. It has previously been proposed to modify the composition of synchronization signal block (SSB) to insert a muted time slot in the SSB of one relay so that this relay can measure the SSB from another relay even when the SSBs of two relays are fully aligned, i.e., overlapping in the time domain. However, such an approach may potentially have impacts on the user equipment (UE) synchronization procedure. In this regard, embodiments of the disclosure aim to minimize impacts so that UE synchronization will not be affected.

Figure 3:
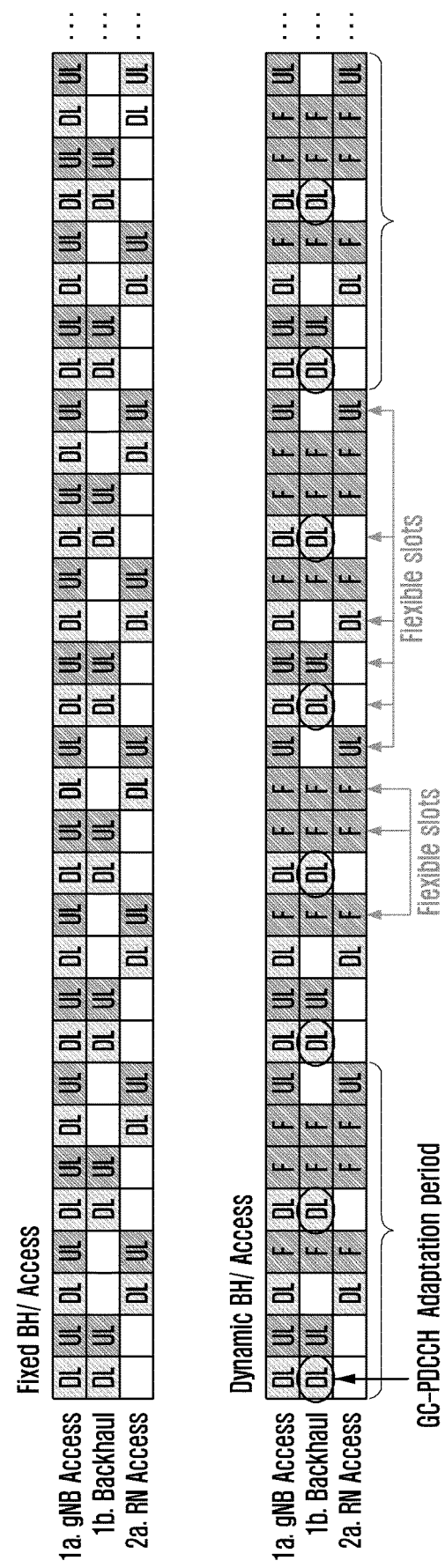
FIG. 3 shows details of a resource allocation (RA) according to an embodiment of the disclosure.

FIG. 3 shows details of a resource allocation (RA) according to an embodiment of the disclosure.

Figure 4:
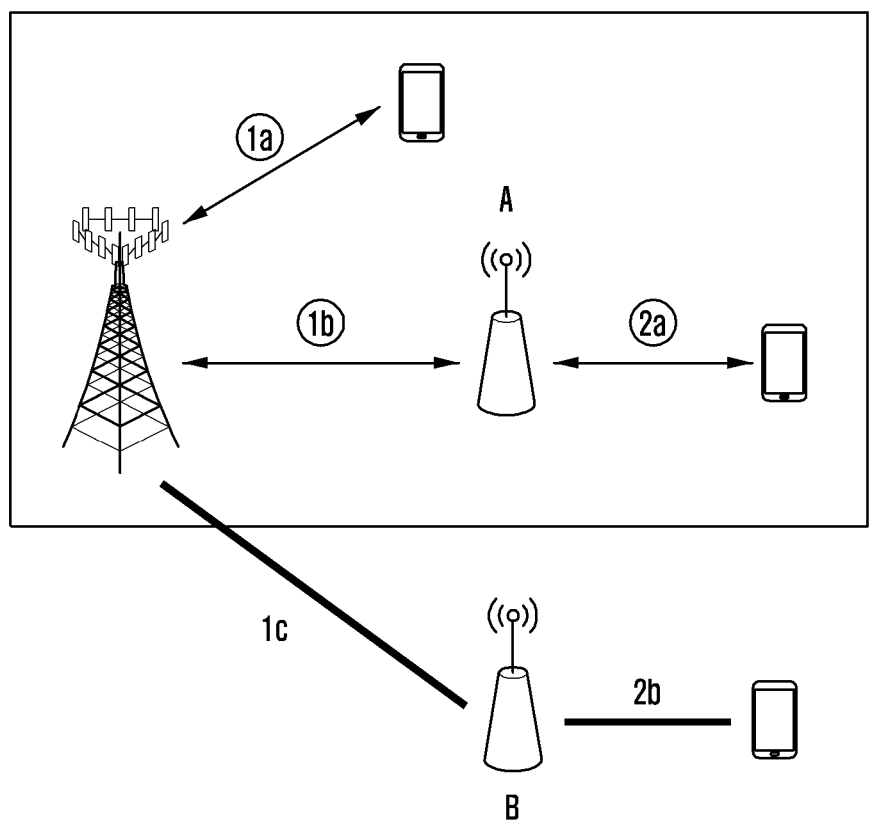
FIG. 4 shows a network setup associated with the RA according to an embodiment of the disclosure.

FIG. 4 shows a network setup associated with the RA according to an embodiment of the disclosure.

One alternative is to apply an RA constraint. For example, in time division multiplexing (TDM), fixed backhaul (BH)/Access as shown in FIGS. 3 and 4, as extended to the two rTRP case shown in FIG. 2 will not work if both rTRPs 20, 30 follow the same RA and there is no slot where rTRP A 20 transmits and rTRP B 30 receives or vice versa. In such a case, a flexible BH/Access scheme could potentially work. For example, if the first flexible slot of 2*a* access link is set as uplink (UL) and for another rTRP, the second flexible slot 2*b* is set as downlink (DL) then rTRP A 20 can receive SSB from rTRP B 30 in this the second flexible slot 2*b*. In such a case, the RA and the DL/UL direction needs to be coordinated.

From an RA point of view, the SSB configuration may be coordinated from three levels:

1) SSB sweeping beams can be circulated, e.g., {S1, S2, S3, S4} for the first sweep with each beam pointing to different directions, and {S2, S3, S4, S1} for the second sweep and so on, incrementally cycling the beams in successive sweeps. By doing this, rTRP A 20 can receive SSB from rTRP B 30 from different directions to identify the beam pointing to rTRP A 20.

2) time location for each SSB within a SS burst may be configured differently. SSB time location is adapted to the resource allocation. For example, if an inter-relay slot appears every N slots, SSB location as defined in the prior at, e.g., {0, 1} may be changed to be multiples of N. When N=4, it can be changed to {0,4}.

3) SS burst periodicities may be configured differently so that SSB collision can be avoided.

Figure 6:
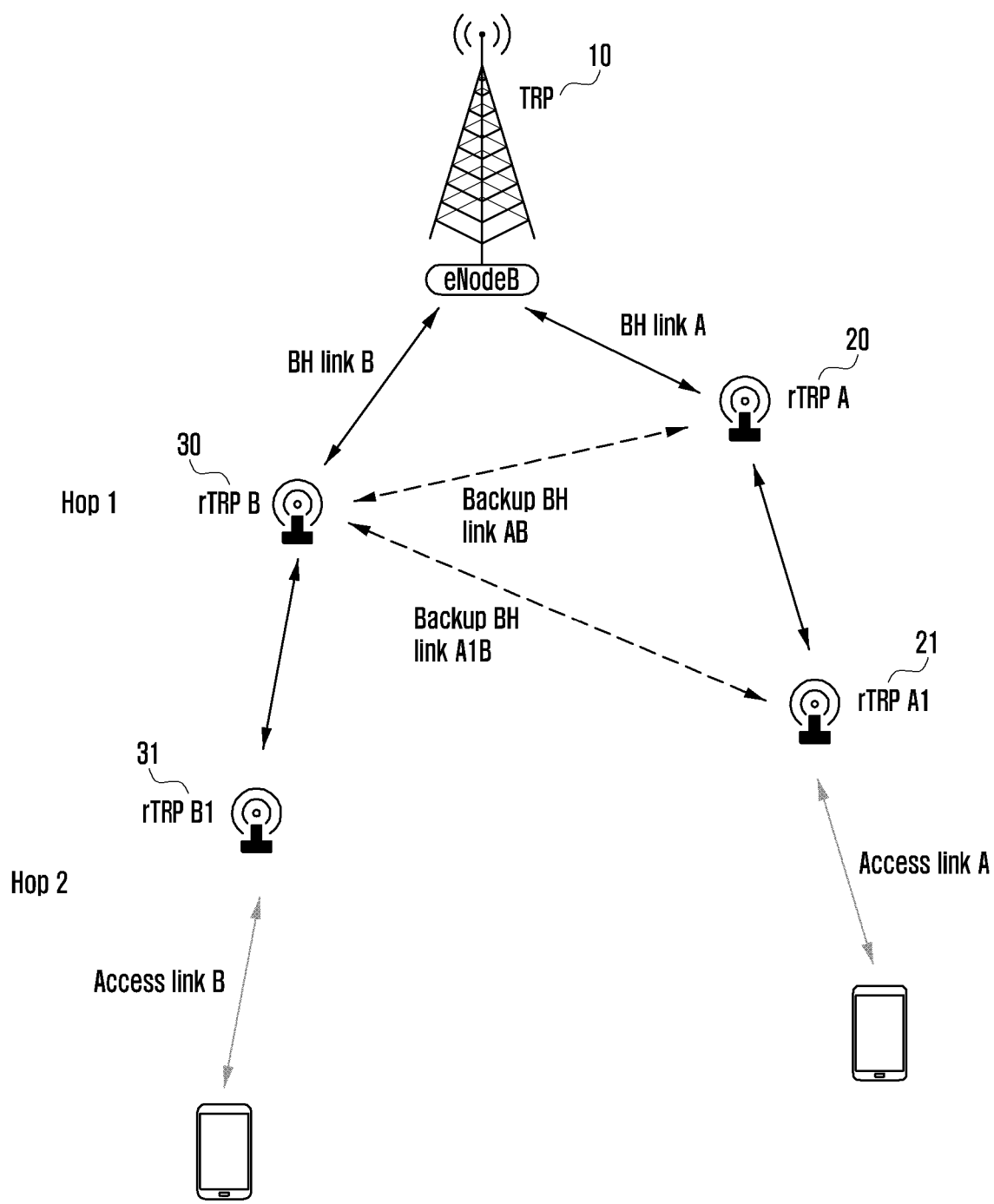
FIG. 6 shows a network configuration according to an embodiment of the disclosure.

FIG. 6 shows a network configuration according to an embodiment of the disclosure.

With the aforementioned approach, it is possible to decide the available time slots to be configured with SSB. It should be noted that the available time slots depend on the hop level of a node. For instance, for a channel between a hop 1 relay node and a hop 2 relay node, there might not be any need to have an RA constraint because it is possible for a hop 1 relay (e.g., rTRP B 30) to transmit and a hop 2 relay (e.g., rTRP A1 21) to receive at the same time referring to FIG. 6, e.g., backup BH link A1B.

The RA constraint might only apply to the relay nodes with the same hop number, e.g., between rTRP A 20 and rTRP B 30, the nodes with odd number of hops, e.g., hop 1 relay node and hop 3 relay node, and the nodes with even number of hops, e.g., hop 2 relay node and hop 4 relay node. Therefore, the hop number is reported to the coordinating nodes to facilitate RA constraint configuration.

Each node reports its associated node cell identity (ID)s to its parent node and when all the reports are collected by the coordinating node, e.g., the donor/root node, the donor/root node can identify the hop number of each relay node. However, the reporting does not necessarily go to the donor/root node. Based on this reporting, the donor/root node coordinates the SSB configuration.

Basically, the root/donor node selects a subset of available resources for its next level nodes for SSB configuration and signals the next level nodes accordingly. The next level nodes then further select a subset from the received subset and then signals its next level nodes. The procedure is repeated until it reaches the last level of relay nodes. Both the report and signaling can be communicated semi-persistently via upper layer signaling, e.g., radio resource control (RRC), media access control (MAC) control element (CE) or dynamically via downlink control information (DCI).

Figure 5B:
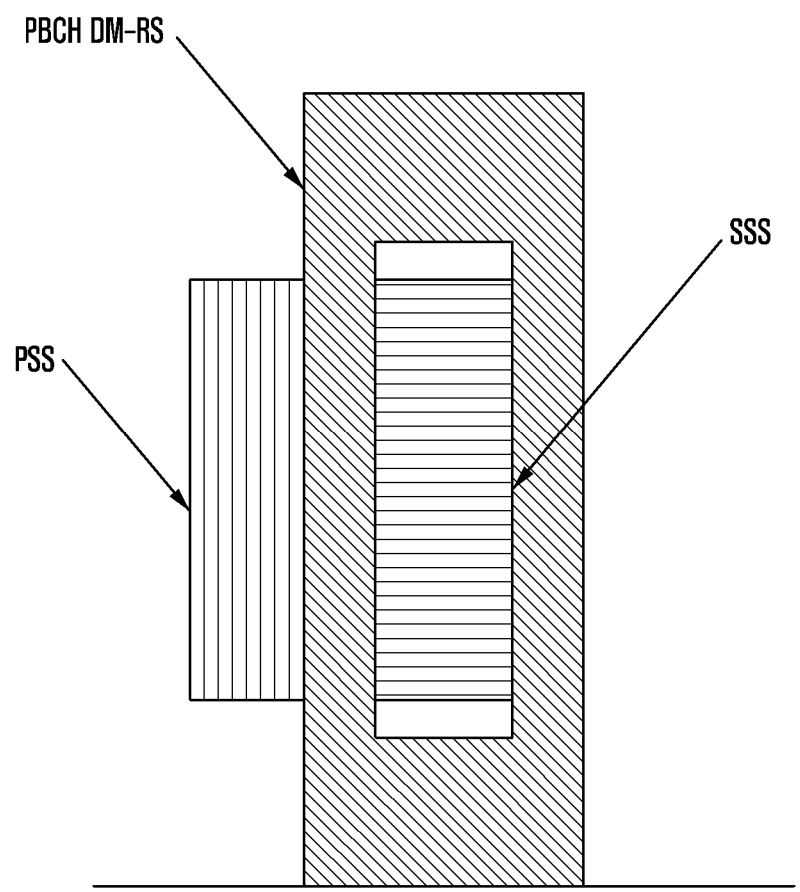

FIGS. 5A and 5B show details of candidates for SSB time location according to various embodiments of the disclosure.

Another solution without an RA constraint is as follows. If rTRP A 20 and rTRP B 30 have the same SSB time location, rTRP A 20 and rTRP B 30 are always transmitting SSB at the same time and therefore they cannot measure each other's SSB. Using FIGS. 5A and 5B as an example, there are 4 candidates for SSB time location shown in FIG. 5A.

FIG. 5B shows a close up detail of each of the 4 candidates.

If both rTRP A 20 and rTRP B 30 configure the first location (the location on the left), then measurement is impossible. Without coordination, this may happen. If rTRP A 20 configures the first and rTRP B 30 configures the second, then measurement is possible but such configuration requires coordination.

In an embodiment, only a subset of possible time locations or SSB index is configured for each rTRP, e.g., for rTRP A 20, location/index 1 and 2 and for rTRP B 30, location/index 3 and 4. This is signaled by the donor TRP 10 to rTRP A 20 and rTRP B 30. Basically, a donor/root node can choose N non-overlapping subsets of SSB index to its N associated relay nodes.

It should be noted that the SSB subset configuration also depends on the hop level of a node. The SSB index subset configuration only applies to the relay nodes with the same hop number, e.g., between rTRP A 20 and rTRP B 30, the nodes with an odd number of hops, e.g., hop 1 relay node and hop 3 relay node, and the nodes with an even number of hops, e.g., hop 2 relay node and hop 4 relay node.

The meaning of root node should be clarified as follows. The root node can be a relay node with which multiple relay nodes are associated. In this regard, the coordination is distributed. The root node can also be the donor node, e.g., donor TRP, and the coordination is centralized.

Figure 7:
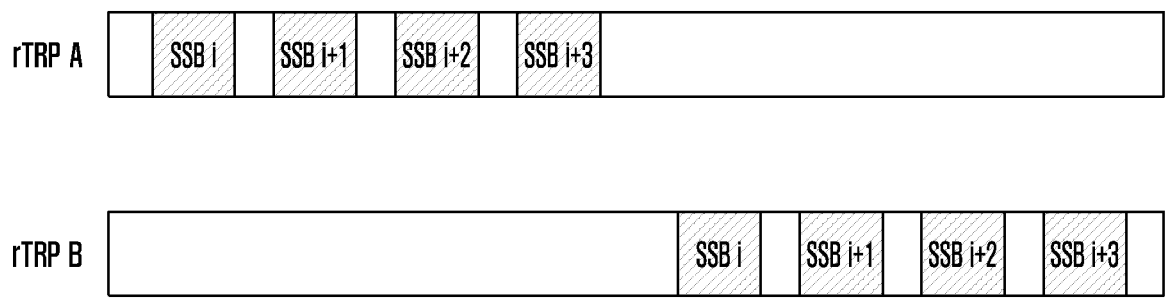
FIGS. 7 and 8 show different offset for synchronization signal block (SSB) configuration for different relay nodes according to various embodiments of the disclosure.
Figure 8:
Figure 8:

FIGS. 7 and 8 show different offset for SSB configuration for different relay nodes according to various embodiments of the disclosure.

The third alternative solution is to have a different offset for SSB configuration for different relay nodes as shown in FIGS. 7 and 8 from both SS burst level and SSB level.

Figure 9:
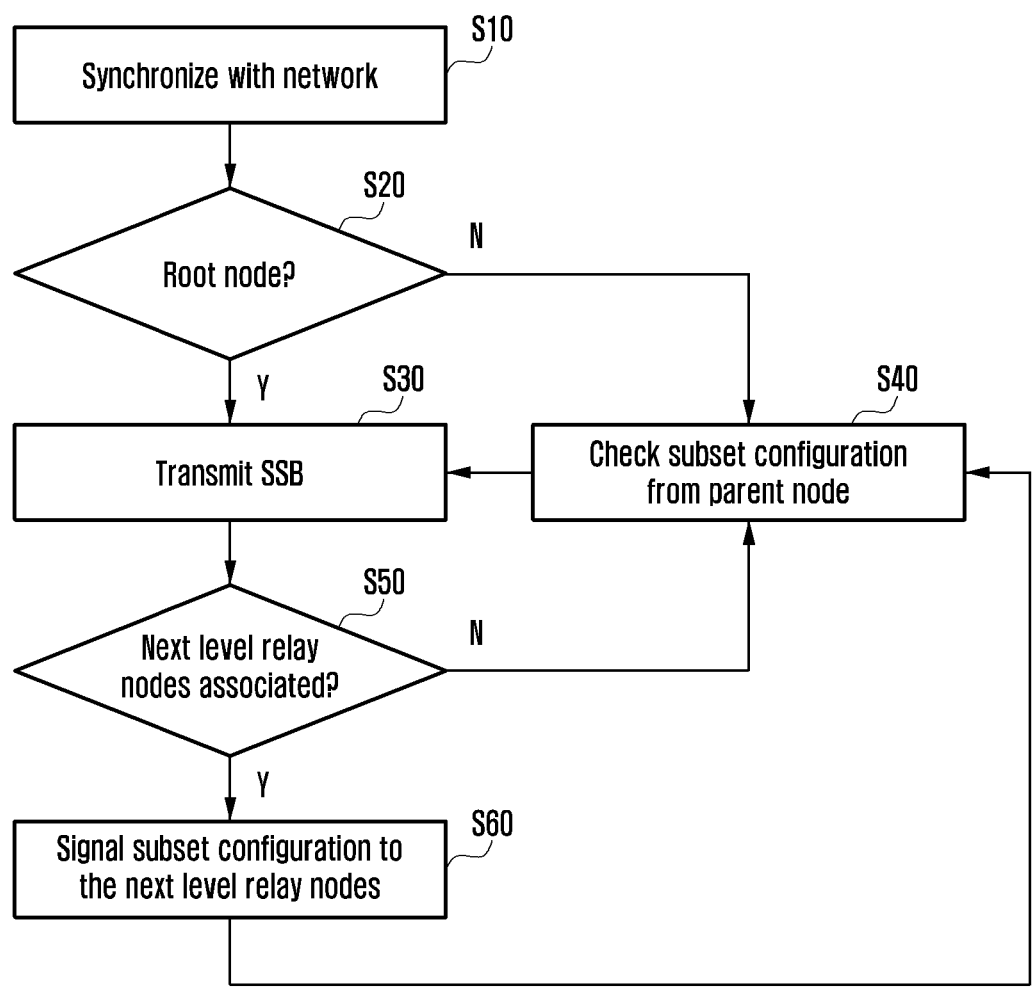
FIG. 9 shows a flowchart of a method according to an embodiment of the disclosure.

FIG. 9 is a flowchart which illustrates a method according to an embodiment of the disclosure.

Referring to FIG. 9, operations S10 to S60 illustrate a method as follows. At operation S10, network synchronization occurs. At operation S20, a determination is made as to whether a node is a root node. If so, SSB is transmitted at operation S30 and then a determination is made at operation S50 as to whether next level relay nodes are associated. If so, then a subset configuration is sent to the next level relay nodes at operation S60.

At operation S20, if a determination is made that a node is not a root node, then a check is made for subset configuration from a parent node at operation S40 and then flow continues, as before to operation S30.

At operation S50, if the next level relay nodes are not associated, then flow continues back to operation S40.

Figure 10:
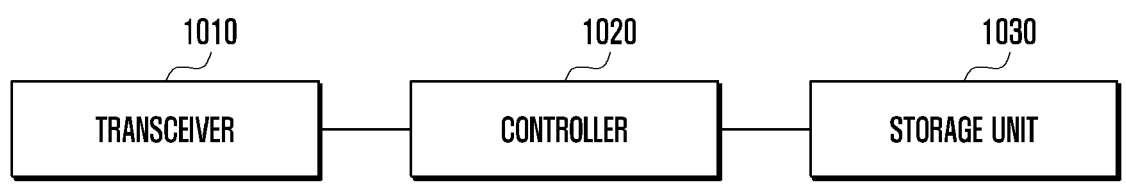
FIG. 10 shows the configuration of a user equipment according to an embodiment of the disclosure.

FIG. 10 shows the configuration of a user equipment (UE) according to an embodiment of the disclosure.

Referring to FIG. 10, the UE may include a transceiver 1010, a controller 1020, and a storage unit 1030. In the embodiment, the controller 1020 may be defined as a circuit, an application-specific integrated circuit, or at least one processor.

The transceiver 1010 may transmit/receive signals to/from other network entities. The controller 1020 may control overall operations of the UE according to the embodiment proposed in the disclosure. The storage unit 1030 may store at least one piece of information transmitted/received through the transceiver 1010 and information produced through the controller 1020.

Figure 11:
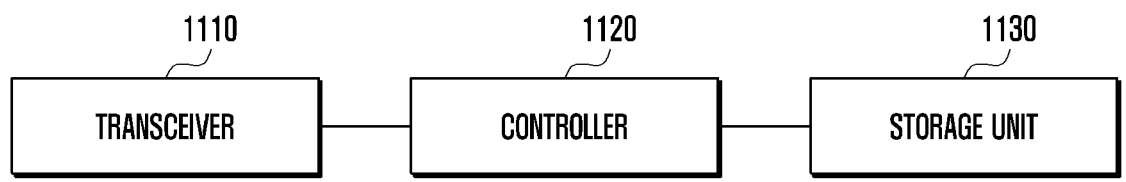
FIG. 11 shows the configuration of a base station according to an embodiment of the disclosure.

FIG. 11 shows the configuration of a base station according to an embodiment of the disclosure. The base station may correspond to the RAN node in the respective embodiments.

Referring to FIG. 11, the base station may include a transceiver 1110, a controller 1120, and a storage unit 1130. In the embodiment, the controller 1120 may be defined as a circuit, an application-specific integrated circuit, or at least one processor.

The transceiver 1110 may transmit/receive signals to/from other network entities. The controller 1120 may control overall operations of the base station according to the embodiment proposed in the disclosure. The storage unit 1130 may store at least one piece of information transmitted/received through the transceiver 810 and information produced through the controller 1120.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a field programmable gate array (FPGA) or application specific integrated circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the operations of any method or process so disclosed, may be combined in any combination, except combinations where at least some of such features and/or operations are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method in an integrated access and backhaul (IAB), the method comprising:
   receiving information on resource allocation;
   determining one of a synchronization signal block (SSB)-based solution or a channel state information-reference signal (CSI-RS)-based solution for configuring a reference signal to manage backhaul (BH) links based on the information; and
   discovering backup BH links based on the solution for configuring the reference signal,
   wherein the SSB-based solution is associated with time division multiplexing (TDM) of SSBs based on a hop order, and
   wherein the configuring of the reference signal is carried out in one of a centralized manner or a distributed manner.

2. The method of claim 1, wherein the reference signal is configured based on differing transmission periodicity.

3. The method of claim 2, wherein the differing transmission periodicity is compared to a periodicity used by access user equipments (UEs).

4. The method of claim 1, wherein the reference signal is configured based on differing transmission offset in at least one of a reference signal burst level or an individual reference signal level.

5. The method of claim 1,
   wherein the centralized manner comprises a donor node configuring the reference signal configuration, and
   wherein the distributed manner comprises a relay node that is associated with other relay nodes configuring the reference signal configuration.

6. An apparatus in an integrated access and backhaul (IAB), the apparatus comprising:
   a transceiver; and
   a processor configured to:
      control the transceiver to receive information on resource allocation,
      determine one of a synchronization signal block (SSB)-based solution or a channel state information-reference signal (CSI-RS)-based solution for configuring a reference signal to manage backhaul (BH) links based on the information, and
      discover backup BH links based on the solution for configuring the reference signal,
   wherein the SSB-based solution is associated with time division multiplexing (TDM) of SSBs based on a hop order, and
   wherein the configuring of the reference signal configuration is carried out in one of a centralized manner or a distributed manner.

7. The apparatus of claim 6, wherein the apparatus comprises a base station.

* * * * *